United States Patent
Hogervorst et al.

(10) Patent No.: US 8,478,028 B2
(45) Date of Patent: Jul. 2, 2013

(54) METHOD AND SYSTEM FOR CONVERTING AT LEAST ONE FIRST-SPECTRUM IMAGE INTO A SECOND-SPECTRUM IMAGE

(75) Inventors: Maarten Andreas Hogervorst, Utrecht (NL); Alexander Toet, Utrecht (NL); Frank Leonard Kooi, Houten (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 923 days.

(21) Appl. No.: 12/376,253

(22) PCT Filed: Aug. 3, 2007

(86) PCT No.: PCT/NL2007/050392
§ 371 (c)(1),
(2), (4) Date: Feb. 3, 2009

(87) PCT Pub. No.: WO2008/016305
PCT Pub. Date: Feb. 7, 2008

(65) Prior Publication Data
US 2010/0002956 A1   Jan. 7, 2010

(30) Foreign Application Priority Data
Aug. 4, 2006   (EP) .................................... 06076532

(51) Int. Cl.
*G06K 9/00* (2006.01)
(52) U.S. Cl.
USPC ........... 382/162; 382/128; 382/164; 382/178; 382/284; 382/181
(58) Field of Classification Search
USPC ................. 348/29, 32, 33, 43, 152, 153, 161, 348/164, 169, E5.09; 358/1.1, 3.28, 540, 358/450; 382/100, 103, 115, 118, 162, 164, 382/165, 173, 181, 284; 600/476, 473
See application file for complete search history.

(56) References Cited

U.S. PATENT DOCUMENTS
4,727,425 A   2/1988   Mayne et al.
5,001,558 A   3/1991   Burley et al.
(Continued)

FOREIGN PATENT DOCUMENTS
EP   0 319 684 A2   6/1989
EP   1 496 689 A1   1/2005
(Continued)

OTHER PUBLICATIONS
Toet, Abstract: "Natural color mapping for multiband night vision imagery" published 2004, IEEE. p. 1.*
(Continued)

*Primary Examiner* — Mekonen Bekele
(74) *Attorney, Agent, or Firm* — Leydig, Voit & Mayer, Ltd.

(57) ABSTRACT

Method for converting at least one image of a first spectrum into an image of a second spectrum, comprising: —recording at least one first-spectrum reference image (NRI) of at least one reference scene (RS) with a first-spectrum recording apparatus (1), the first-spectrum reference image (NRI) comprising first image portions with corresponding first-spectrum sensor reference data (b1, b2); —providing corresponding second-spectrum reference information (RGB); —providing at least one set of reference data (T1, T2) from at least part of the first-spectrum sensor reference data (b1, b2) relating to the reference scene (RS), and at least a corresponding part of the second-spectrum information (RGB) relating to that reference scene (RS); —providing at least one target first-spectrum image (NTI) or target second-spectrum image; and —converting each target first-spectrum image (NTI) or target second-spectrum image into a respective second-spectrum image (CI) or first-spectrum image, respectively, using the set of reference data (T1, T2).

19 Claims, 3 Drawing Sheets

U.S. PATENT DOCUMENTS

| | | | |
|---|---|---|---|
| 5,481,401 A * | 1/1996 | Kita et al. | 359/353 |
| 6,473,090 B1 * | 10/2002 | Mayer | 345/587 |
| 6,792,136 B1 | 9/2004 | Niesen | |
| 7,280,260 B2 * | 10/2007 | Hagai et al. | 358/518 |
| 7,852,515 B2 * | 12/2010 | Eschbach et al. | 358/3.28 |
| 2005/0195453 A1 | 9/2005 | Asano | |
| 2008/0111894 A1 * | 5/2008 | Tanimoto | 348/222.1 |
| 2008/0187215 A1 * | 8/2008 | Gordon et al. | 382/162 |

FOREIGN PATENT DOCUMENTS

| | | |
|---|---|---|
| JP | 02-107930 | 4/1990 |
| JP | 2005274142 | 10/2005 |
| JP | 2005274142 A * | 10/2005 |

OTHER PUBLICATIONS

Toet A: "Natural colour mapping for multiband nightvision imagery," The Institution of Electrical Engineers, Stevenage, GB (Sep. 2003); Database accession No. 7942511 cited in the application abstract & Information Fusion Elsevier USA vol. 4, No. 3, 2003, pp. 155-166, ISSN: 1566-2535.

International Search Report for PCT/NL2007/050392, dated Apr. 3, 2008.

* cited by examiner

METHOD AND SYSTEM FOR CONVERTING AT LEAST ONE FIRST-SPECTRUM IMAGE INTO A SECOND-SPECTRUM IMAGE

FIELD OF THE INVENTION

The invention relates to a method and system for converting at least one first-spectrum image into a second-spectrum image.

BACKGROUND

Various methods are known from the prior art to convert first-spectrum images into colour images. A prior art method is described in the article "Natural colour mapping for multi-band nightvision imagery" by Alexander Toet, Information Fusion, vol 4 (2003), pp 155-166. In this article, a method is presented to give (fused) multispectral nighttime imagery a natural daytime colour appearance. For input the known method requires a false colour RGB image that is produced by mapping 3 individual bands (or the first 3 principal components) of a multiband nightvision system to the respective channels of an RGB image. The false colour RGB nightvision image is transformed into a perceptually decorrelated colour space. In this colour space the first order statistics of natural colour image (target scene) are transferred to the multispectral nightvision image (source scene). The only requirement of the method is that the colour compositions of the source and target scenes resemble each other to some degree.

The known method is based on equalizing statistical properties (average, standard deviation) of the colours in the multi-band image to that of a reference colour image. An advantage of this method is that a target image can be transformed based on an arbitrary reference colour image. (e.g. colours from a Van Gogh painting can be applied to provide a reference for the transformation).

SUMMARY OF THE INVENTION

The present invention aims to provide an improved method and system for converting first-spectrum images into second-spectrum images. Particularly, the invention aims to provide a method and system, which can provide improved second-spectrum images in a relatively simple, swift manner.

According to an embodiment of the invention, there is provided a method for converting at least one first-spectrum image into a second-spectrum image, the method comprising:
  recording at least one first-spectrum reference image of at least one reference scene with a first-spectrum recording apparatus, the first-spectrum reference image comprising first image portions with corresponding first-spectrum sensor reference data;
  providing corresponding second-spectrum reference information;
  providing at least one set of reference data from at least part of the first-spectrum sensor reference data relating to the reference scene, and at least a corresponding part of the second-spectrum information relating to that reference scene;
  providing at least one target first-spectrum image or target second-spectrum image; and
  converting each target first-spectrum image or target second-spectrum image into a respective second-spectrum image or first-spectrum image, respectively, using the set of reference data.

For example, the second-spectrum can be a broad visible spectrum, comprising colours that are detectable by the human eye, and the first-spectrum can be a different spectrum, for example including infra-red wavelengths. As an example, the method is advantageous to convert night-vision images into natural, true colour, images.

The reference data can be used to transform a first-spectrum or second spectrum target image (which, during use, will generally not be an image of the reference scene, but an image of a target scene to be viewed) into a second-spectrum/first-spectrum image of a target scene. In this way, a relatively fast conversion can be carried out, utilizing for example relatively simple conversion means or algorithms. Besides, the present method can be used to provide converted, coloured, night-vision imagery having more natural looking colours, for example substantially true colour imagery. For example, in this way there can be provided a relatively fast (computationally inexpensive) algorithm, that is preferably applicable in real-time. Also, the method can provide a more robust algorithm, resulting in object colours that remain constant over time. Besides, there can be provided an increased realism of the colours: (i.e. an optimal colouring scheme resulting in colours that are highly similar to the daylight colours). Moreover, the invention can provide a general colouring method, that can also be applied to sensor signals with any number of bands larger than 1. For example, in a further embodiment, the mentioned image portions are pixels. Besides, for example, the target image can be a recorded image, recorded by a suitable recording device, or be provided differently, for example provided by computer calculations, by a computer simulator.

In the present application, the term 'reference scene' should be interpreted broadly, since a reference scene can include an indoor scene, an outdoor scene, and/or for example a set of samples of different materials for which the first spectrum sensor-output and the corresponding second spectrum information is known, for example via visual inspection of the materials in case the second-spectrum is the natural true-colour spectrum.

For example, the first-spectrum image can be a night-vision image, and the second-spectrum image can be a natural colour image, or vice-versa. Generally, the first spectrum differs from the second spectrum, and relate for example to different colour schemes. As an example, each spectrum can be provided by one or more spectral bands. Particularly, one of the mentioned spectra (for example the second spectrum) can be limited to the visible light spectrum, or part thereof, and the other of the spectra (for example the first spectrum) can extend or lie beyond the visible light spectrum.

As follows from the above, an application of the invention lies within night-time observance systems, like military night vision goggles and observation camera's. Vice-versa, the invention in addition provides a method for the conversion of day colour imagery into night-vision imagery. The application of the day-to-night conversion lies within the simulation industry, given that daytime colour imagery is commonly available while night-vision imagery is scarce due to its purely military scope.

In a further embodiment, the method can comprise:
  generating an indexed data set involving the indexing of a plurality of achievable first-spectrum sensor reference data parts which can be generated by the first-spectrum recording apparatus, for example by providing a list of all achievable first-spectrum sensor values or an array of a plurality of achievable first-spectrum sensor values;
  assigning the second-spectrum reference information to the indexed data set, utilizing the at least one first-spectrum reference image, such that the indexed first-spectrum sensor reference data parts and corresponding second-spectrum reference information parts are provided with the same index pointer.

For example, the indexing of a plurality of achievable first-spectrum sensor reference data parts, which can be generated by the first-spectrum recording apparatus, can involve providing an index (comprising a plurality of index pointers) and assigning various achievable first-spectrum sensor reference data parts to the various pointers (so that one index pointer relates to one first-spectrum sensor data part).

As an example, in case a two-band night vision sensor device is applied, to provide first-spectrum (night-vision) reference data, and each band can achieve 256 different sensor values (for example from 1 to 256), the indexed data set might have 256×256 entries (with data pointers ranging from 1 to 65536). Besides, in this example, in case an indexed data set of only 256 entries is applied, the entries can relate to a regular or even distribution of the achievable sensor signals. Such indexing of data or images is well known to the skilled person, and resembles or is equal, for example, to gray-scaling true-colour images as applied by commonly available computer drawing programs.

In a further embodiment, in case of conversion of a first-spectrum image into a second-spectrum image, the method can comprise:
matching target image portions of the first-spectrum target image to first image portions of a set of reference data;
assigning second-spectrum information parts to all target image portions in such way, that each target image portion is linked to the second-spectrum information part that belongs to the first image portion which matches the respective first-spectrum sensor target image portion most closely; and
generating the second-spectrum image based on the assigned second-spectrum information parts.

Similarly, in case of conversion of a second-spectrum image into a first-spectrum image, the method can comprise:
matching target image portions of the second-spectrum target image to second image portions of a set of reference data;
assigning first-spectrum information parts to all target image portions in such way, that each target image portion is linked to the first-spectrum information part that belongs to the second image portion which matches the respective second-spectrum reference information most closely; and
generating the first-spectrum image based on the assigned first-spectrum information parts.

As follows from the above, at least part of the second-spectrum reference information can already be known, for example via visual inspection of a reference scene. Also, the second-spectrum reference information can be provided by:
providing at least one second-spectrum reference image of each reference scene, the at least one second-spectrum reference image comprising second, second-spectrum, image portions with corresponding second-spectrum information.

Also, according to a further embodiment, the set of reference data can simply be being generated by:
selecting a plurality of first, first-spectrum, image portions and corresponding second, second-spectrum, image portions, such that reference scene image coordinates of a first image portion substantially correspond to reference scene image coordinates of the corresponding second image portion;
indexing the first-spectrum sensor reference data and the second-spectrum information, for example in at least one lookup table, such that each entry in a resulting index refers to the first-spectrum sensor reference data and the corresponding second-spectrum information associated with a selected first image portion and a corresponding second image portion. As follows from the above, for example, the index might be build up starting with a list of predetermined potentially achievable first-spectrum sensor reference data, and joining the second-spectrum information to the list, utilizing the mentioned first (night vision) and second (second-spectrum) image portions.

In yet a further embodiment, the method can comprise:
finding a closest match between first-spectrum sensor data associated with each target image portion of a recorded target image and the first-spectrum sensor reference data of the first image portions;
replacing each target image portion with the second, second-spectrum, image portion, which second image portion is associated with the first image portion that most closely matched that target image portion, the matching being based on the first-spectrum sensor data, to generate the second-spectrum image.

Alternatively, the method can comprise, in case of conversion of target second-spectrum images into respective first-spectrum images:
finding a closest match between second spectrum information associated with each target second-spectrum image portion of a target second-spectrum image and the second-spectrum information of the second image portions;
replacing each second-spectrum target image portion with the first, first-spectrum, image portion, which first image portion is associated with the first image portion that most closely matched that target image portion, the matching being based on the second-spectrum information, to generate the first-spectrum image.

Also, in a further embodiment, the method comprises:
finding a closest match between first-spectrum sensor data associated with each target image portion of a recorded target image and the first-spectrum sensor reference data of the first image portions;
replacing each target image portion with the respective index entry pointer to provide an index image; and
converting the index image into the second-spectrum image by replacing each index entry pointer with the respective second-spectrum information of that index entry.

In the alternative case, in case of conversion of target second-spectrum images into respective first-spectrum images, the method can comprise:
finding a closest match between second-spectrum information associated with each target image portion of a target second-spectrum image and the second-spectrum reference data of the second image portions;
replacing each target image portion with the respective index entry pointer to provide an index image; and
converting the index image into the first-spectrum image by replacing each index entry pointer with the respective first-spectrum information of that index entry.

The invention also provides a system that is characterised by the features of claim 11. The system is preferably being configured to carry out a method according to the invention, and can comprise:
at least a first-spectrum recording apparatus configured to generate first-spectrum sensor reference data relating to at least one reference scene;
at least a second-spectrum information provider configured to provide natural second-spectrum information relating to the same reference scene; and at least a target image generator configured to provide at least a first-spectrum target image or at least a second spectrum target image of a target scene;

wherein the system is provided with a converter which is configured to convert each target first-spectrum image into a respective second-spectrum image, or vice-versa each target second-spectrum image into a respective first-spectrum image, using at least part of the mentioned first-spectrum sensor reference data in combination with a corresponding part of the mentioned natural second-spectrum information.

Also, there is provided a computer program or computer program product, for example an information carrier, comprising computer code, configured to carry out conversion of a first-spectrum target image into a second-spectrum image, or vice-versa, according to a method according to the invention when executed by a computer device, and/or configured to provide a converter of a system according to the invention when executed by a computer device. As an example, the information carrier can carry a reference data set, generated in a method according to the invention, the reference data set being provided from at least part of the first-spectrum sensor reference data relating to the reference scene, and at least a corresponding part of the second-spectrum information relating to that reference scene.

In an embodiment, a basic idea behind the present invention is to use at least one set of image samples for which both the sensor values and the corresponding second-spectrums are known, which can provide the above-mentioned advantages. Herein, a perceptually decorrelated second-spectrum space is not used to transform first-spectrum images into natural second-spectrum images.

For example, the closest matching colouring concept described above can be used to turn a single (or multi-band) sensor image into a daytime colour image. The present method can also be used to turn a daytime colour image into a single (or multi-band) sensor image. In this case, the reference image is the (single or multi-band) sensor image can an the image that one seeks to simulate, and a target image contains daytime colour information. This reverse scheme can be applied to sensor simulation, converting commonly available day imagery into night time imagery. This can function to automatically generate night vision databases from existing day-view databases.

Another application of the invention is, to colour or recolor old images, videos and photos, for example second-world war colour films, to enhance such images, videos and photos. In that case, for example, both reference images and target images can be colour images.

BRIEF DESCRIPTION OF THE DRAWINGS

Further advantageous embodiments of the invention are described in the dependent claims. These and other aspects of the invention will be apparent from and elucidated with reference to the embodiments described hereafter.

DETAILED DESCRIPTION OF THE DRAWINGS

In the present application, equal or corresponding features are denoted by equal or corresponding reference signs.

Figure 1:
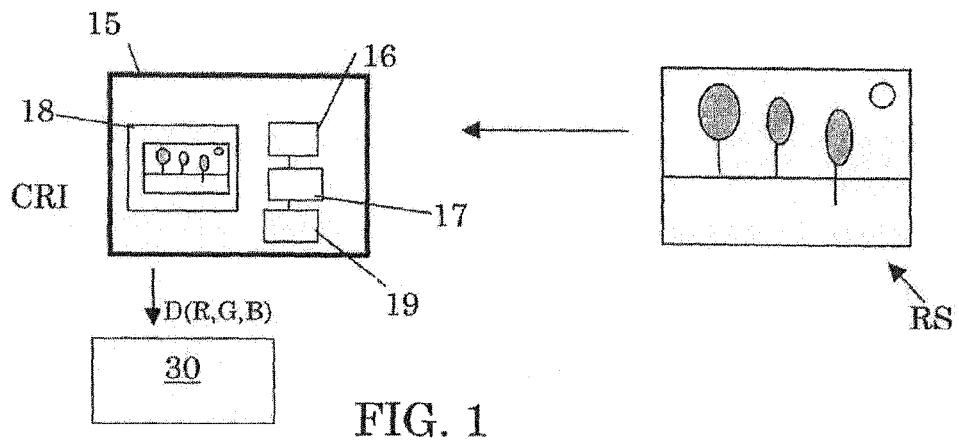
FIG. 1 schematically depicts a method and system according to an embodiment of the invention, during a first step of generating a reference dataset.
Figure 2:
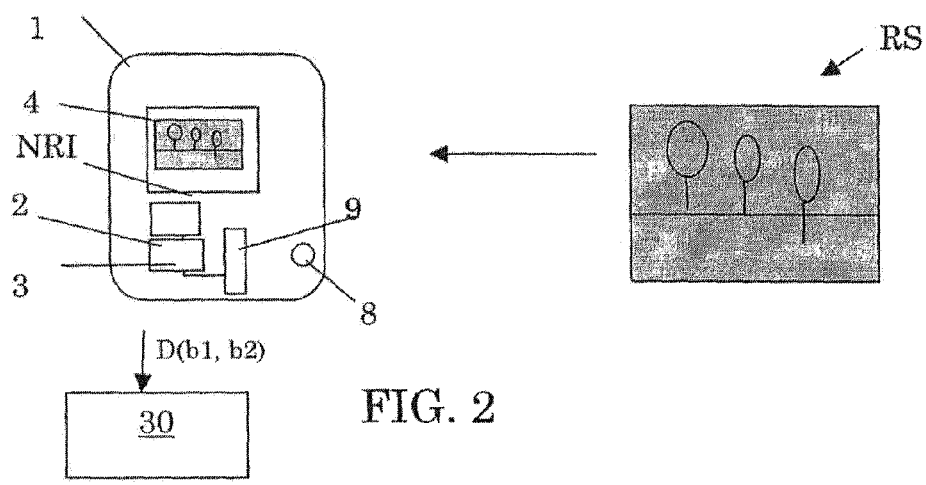
FIG. 2 schematically depicts the method and system according to an embodiment of the invention, depicting a further step of generating a reference dataset.
Figure 3:
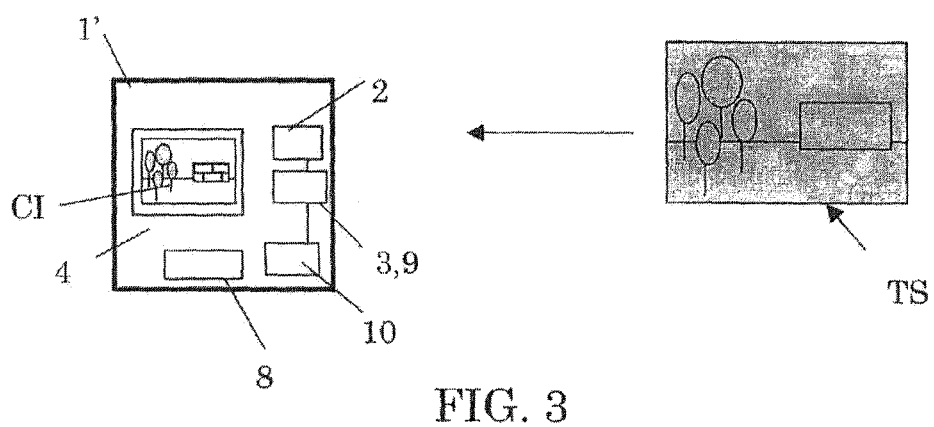
FIG. 3 schematically depicts the method and system according to an embodiment of the invention, during recording of a target scene and conversion of a night-vision image into a colour image.

FIGS. 1-3 schematically show a system for converting night-vision target images, of target scenes TS into respective colour images CI. Vice-versa, the system can be applied to convert colour target images, of into respective night-vision images, or the recolor old, for example decayed or faded, colour images.

In the present embodiment, the system can comprise:
- at least a colour information provider 5 configured to provide natural colour information (i.e. second spectrum information) relating to at least one reference scene RS (see FIG. 1);
- at least a night-vision apparatus 1 (i.e. first spectrum recording apparatus) configured to generate night-vision sensor reference data relating to the same reference scene(s) RS (see FIG. 2); and
- at least a night-vision apparatus 1' configured to generate a target night-vision image NTI of a target scene TS (see FIG. 3);

Also, the system can be provided with a converter 10 which is configured to convert each recorded target image NTI into a respective colour image CI, using at least part of the mentioned night-vision sensor reference data in combination with a corresponding part of the mentioned natural colour information.

In the present embodiment, the system comprises two night-vision apparatus 1, 1'. The construction of a night-vision apparatus as such is known to the skilled person, and will therefore not have to be explained in detail in the present application. Basically, a night-vision apparatus is a system that records images that are not directly visible to the human eye (e.g. a system comprising an image intensifier or IR-sensor). For example, the night vision apparatus 1 comprises one or more sensors 2, each sensor 2 being configured to detect one or more bands of the light spectrum. Thus, the apparatus 1 can be a single band apparatus, configured to detect a single light band, but preferably the apparatus 1 is a multi-band apparatus, configured to detect multiple bands (for example: a first band relating to visible light and a second band relating to infrared—invisible-light, or a first band comprising light wavelengths <700 nm and a second band comprising wavelengths >700 nm, or more than two bands). In the following, as a non-limiting example, the embodiment will be explained with respect to double-band night-vision detection, the values of the two bands being denoted by b1 (band 1) and b2 (band 2). The night-vision apparatus can be used to improve sight during impaired visual circumstances, for example during the night. For example, the night-vision apparatus can be configured to generate a still image and/or (semi-) continuous real time video of a target scene.

Also, the night-vision apparatus 1 can be configured to intensify a recorded image, and to display the image on a display 4. For example, the mentioned one or more sensors 2 of the apparatus can be configured to provide image intensifications, particularly in case a sensor 2 is provided with a image intensifier. Also, dedicated image intensifying means can be provided in the apparatus. Particularly, the night-vision apparatus 1 is configured to digitally record an image of a scene, for example an image that is build up from pixels.

Besides, a night-vision apparatus 1 can comprise a signal processor unit 3, for example comprising a suitable control, computer, controller, analogue and/or digital video processor, signal processing software and/or hardware, and/or other suitable signal processor means. Preferably, the apparatus 1 is provided with at least one memory unit 9, for example being integrated in signal processor unit 3 (as in FIG. 3) or a separate memory (see FIG. 2), which memory unit can store sensor signal data relating to a detected target scene and/or other information.

The signal processor unit 3 can be coupled to the sensor(s) 2 for processing sensor signals, and can be configured to output processed sensor signals to the display 4 for displaying a detected target scene to a user of the device 1. Also, a user interface 8 can be provided, for example comprising one or more buttons, switches, a keyboard, a touch screen, and/or other suitable user interaction means, for operating the apparatus 1.

FIG. 2 schematically depicts a first night-vision apparatus 1, and FIG. 3 shows a second night-vision apparatus 1'. Preferably, the night-vision apparatus 1, 1' are substantially of the same type, for example being provided with substantially the same type of night-vision sensor(s) 2, or being configured to detect substantially the same bands of the spectrum, and/or to detect light in various bands having substantially the same boundary wavelengths.

In the present system, the second night-vision apparatus 1' of FIG. 3 can be used to generate/record target night-vision images NTI of target scenes TC. In the present system embodiment, the apparatus 1' of FIG. 3 is further provided with a mentioned converter 10 to convert target images NTI into respective colour (or colorized) images CI, which colour images can be displayed on a respective colour display 4. An operation of the converter 10 will be explained below in more detail. The converter 10 can be designed in various ways, and can—for example—be a separate component or be integrated with a mentioned signal processing unit 3. For example, at least part of the converter 10 can be provided by a computer program, comprising computer code, configured to carry out conversion of a night-vision target image into a colour image during execution thereof.

The colour information provider can be configured in various ways, and can be, for example, a colour image recorder 5. The recorder 5 can be configured to record natural colour information relating to at least one reference scene RS. A resulting recorded image can be a digital colour image, build up from colour pixels, wherein each pixel preferably can assume a large number of colours, for example thousands or millions of colours.

For example, the colour image recorder 5 can be configured to record colour information that comprises at least three different colours visible by the human eye, for example red, green and blue. Also, the natural colour information can include various types of information, and is preferably such that a true colour image can be reconstructed from that information. In the present embodiment, the natural colour information simply comprises data in the red-green-blue (RGB) format, wherein each pixel of the image has been provided with respective RGB values.

For example, the colour image recorder 5 can be a video and/or photo camera, an image colour scanner, and/or another suitable type of colour image generator. Also, for example, a colour image recorder can be integrated with a mentioned night-vision apparatus 1, for example in a combined daytime/night-time imaging apparatus.

As is schematically depicted in FIG. 1, as an example, a colour image recorder 5 can comprise one or more suitable colour sensors 16, a signal processor 17, a memory 19 and display 18, to detect a target (reference) scene, process respective sensor signals relating to the target scene, store the sensor signals and display a recorded image of a target scene, respectively.

Instead of using a colour image recorder 5, for example, colour information can be provided by visual inspection of a target scene, or in a different manner.

In the present embodiment, the system can comprise a data processor 30, configured to receive recorded data from a mentioned night-vision apparatus 1 and colour image recorder 5. As an example, the data processor 30 can be a separate processing unit, or be integrated with a night-vision apparatus 1 and/or colour image recorder 5. Communication between the data processor 30, a night-vision apparatus 1 and colour image recorder 5 can be achieved in various ways, for example via wireless and/or wired communication links, as will be appreciated by the skilled person. A data-transfer from the colour image recorder 5 to the data processor 30 is represented by an arrow D(R,G,B) in FIG. 1. For example, this data-transfer D(R,G,B) can comprise transferring a recorded colour image to the data processor 30. In FIG. 2, a data-transfer from the night-vision apparatus 1 to the data processor 30, for example to load a recorded night-vision image into the data processor 30, is represented by an arrow D(b1, b2).

Figure 4:
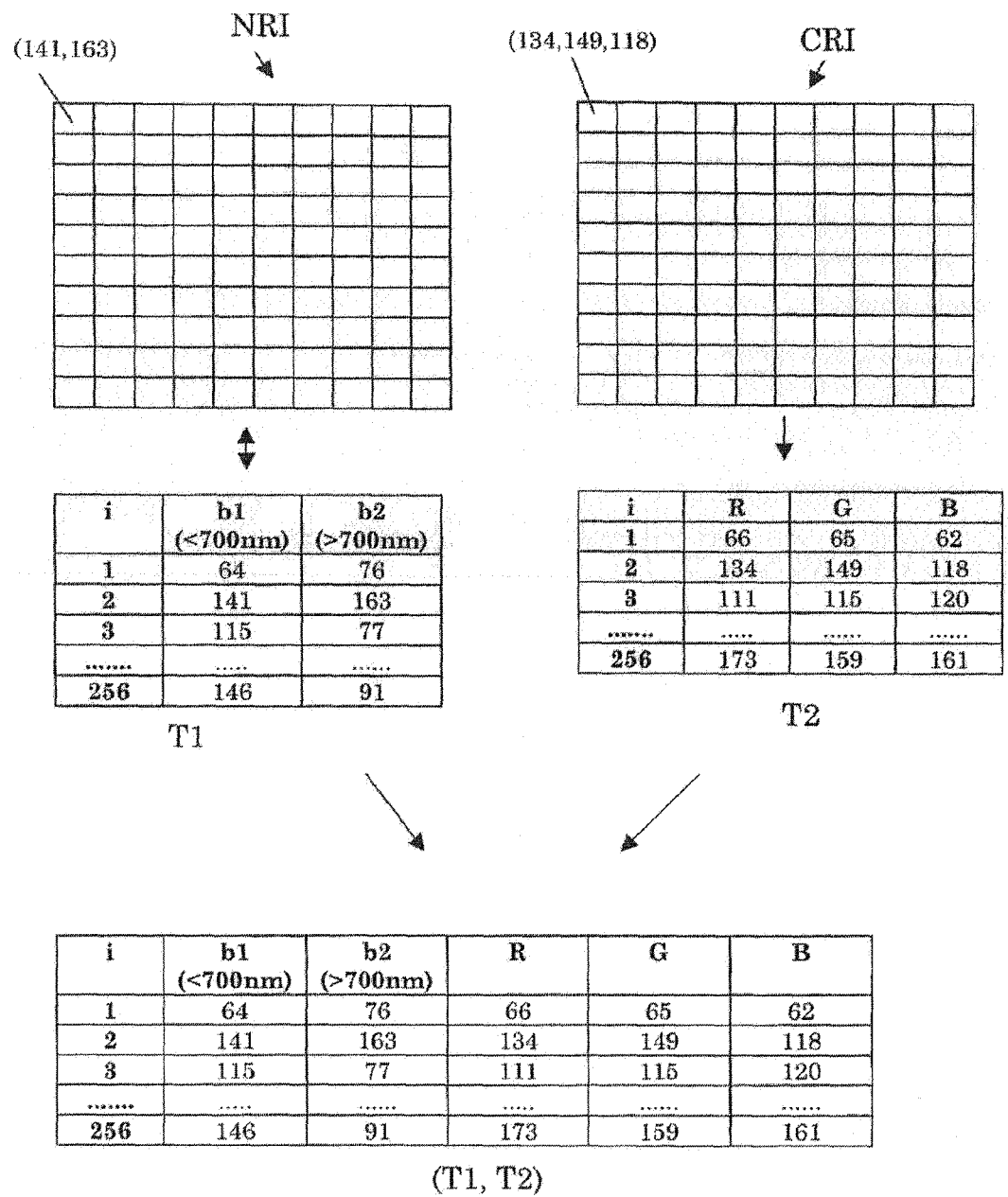
FIG. 4 is a diagram showing the generation of the reference data set.

In the present embodiment, the data processor 30 is configured to process mentioned night-vision sensor reference data and the natural colour information to provide at least one set of reference data T1, T2 (see FIG. 4). For example, the data processor 30 can be configured to select a plurality of first, night-vision, image portions (for example image samples, pixels or pixel groups) and corresponding second, colour, image portions, such that reference scene image coordinates of a first image portion substantially correspond to reference scene image coordinates of the corresponding second image portion. For example, an image portion can be a pixel, or a small group of adjoining pixels, or a sample from the respective image. In an embodiment, first image portions are being selected first, after which corresponding second image portions are being searched for. Alternatively, second image portions can be being selected first, after which corresponding first image portions are being searched for, or a combination of selecting image portions from the night vision target image and selecting image portions from the colour image can be applied. Besides, advantageously, first and/or second image portions can be selected randomly from the respective image(s).

Alternatively, it is advantageous when the data processor 30 is configured to determine which night-vision sensor reference data can be achievable by the night vision apparatus 1, and to build an indexed data set based on that determination. For example, a list of potentially achievable night-vision sensor values can already be loaded into a memory of the data processor 30, or be provided to the data processor 30 via a suitable interface, for example a user interface or via communication means between the data processor 30 and the night vision apparatus 1. In the latter case, the night-vision apparatus 1 can be configured to send a list of potentially achievable sensor values to a data processor 30.

The reference data set T1, T2 might comprise (or be based on) substantially all night-vision sensor reference data and the colour information, relating to at least one reference scene RS. Also, for example, only a portion of night-vision sensor reference data and corresponding colour information can be used to form a respective reference data set T1, T2. For example, a reference image may comprise thousands or even millions of pixels, wherein only about a thousand first pixels (and second pixels) or less can be selected to assemble a reference data set. However, to provide best results, preferably, substantially all night-vision sensor reference data and corresponding colour information are used to generate the reference data set T1, T2.

For example, the data processor 30 can index the night-vision sensor reference data and the colour information, for example in at least one lookup table T1, T2 (see FIG. 4), such that each entry in a resulting index refers to the night-vision sensor reference data (b1, b2) and the corresponding colour information (R,G,B) associated with a first image portion (for example pixel) and a corresponding second image portion (for example pixel). Herein, the reference scene image coordinates of each first image portion substantially correspond to reference scene image coordinates of the corresponding second image portion (such that each first and second image portion relate to substantially the same part of the reference scene). To find corresponding first and second image portions, the data processor 30 can use various data processing techniques, as will be appreciated by the skilled person, for example pattern recognition, image resealing, image matching and/or other methods.

In a further embodiment, the indexing involves the use of an array or list of potentially achievable night-vision sensor reference data, of which is already known that the data might be generated by the night-vision apparatus 1 (independent of the question, wherein all such data is indeed generated when the night vision apparatus 1 detects the reference scene RS). For example, an indexed data set can be generated, involving the indexing of a plurality of achievable night-vision sensor reference data which can be generated by the night-vision apparatus, wherein the colour reference information (RGB) can be assigned to the indexed data set, utilizing the at least one night-vision reference image (NRI), such that the indexed night-vision sensor reference data parts and corresponding colour reference information parts are provided with the same index pointer.

Examples of mentioned lookup tables T1, T2 are depicted in FIG. 4. In the present embodiment, for example, the indexed data set comprises a first table T1 relating to (potentially achievable) first image portions and respective (potentially achievable) night-vision sensor data, for example multi band sensor data. Also, the indexed data set comprises a second table T2 relating to second image portions and respective colour information, for example respective red, green and blue values. Each data set T1, T2 can be stored in various ways, in various formats, digitally, in a memory, as will be appreciated by the skilled person.

As an example, the first table T1 can include a predetermined list of all sensor data, that might be obtained by the night vision apparatus, or part of the sensor data. As an example, in the case that the sensors of the apparatus 1 can generate 256 different first band sensor values and 256 different second band sensor values, an index having a total of 256×256 different entries can be build (however, in FIG. 4, the index contains a significantly smaller amount of entries: only 256).

A mentioned converter 10 of a night-vision apparatus 1' can be configured to convert a recorded target image NTI into a respective colour image CI, using a mentioned reference data set T1, T2 that has been provided by the data processor unit 30. For example, a set of reference data T1, T2, comprising the mentioned night-vision sensor reference data in combination with the mentioned natural colour information relating to the mentioned reference scene, is preferably stored in a memory 9 of the night-vision apparatus 1', such that the converter 10 can read the reference data set T1, T2. As an example, the reference data T1, T2 can be stored in a mentioned memory 9 of the signal processor, and/or the converter 10 can be provided with a memory which holds the data set.

In a further embodiment, the system can be configured to utilize various sets of reference data, relating to different reference scenes. For example, the converter 10 of a night-vision apparatus 1' can be controllable to select one of the sets of reference data for converting target images into colour images, for example via a mentioned user interface B. Preferably, the different data sets are provided to the converter 10 via a suitable memory of the apparatus 1', as described above.

For providing conversion of a target image NTI into a colour image CI, for example, the converter 10 can be configured to find a closest match between night-vision sensor data associated with each target image portion of a recorded target image NTI and the night-vision sensor reference data of the first image portions. Also, the converter 10 can be configured to replace each target image portion with the second, colour, image portion, which second image portion is associated with the first image portion that most closely matched that target image portion, the matching being based on the night-vision sensor data, to generate the colour image CI. Besides, the converter 10 can be configured to replace each target image portion with the respective index entry pointer to provide an index image, and to replace each index entry pointer with the respective colour information of that index entry.

Figure 5:
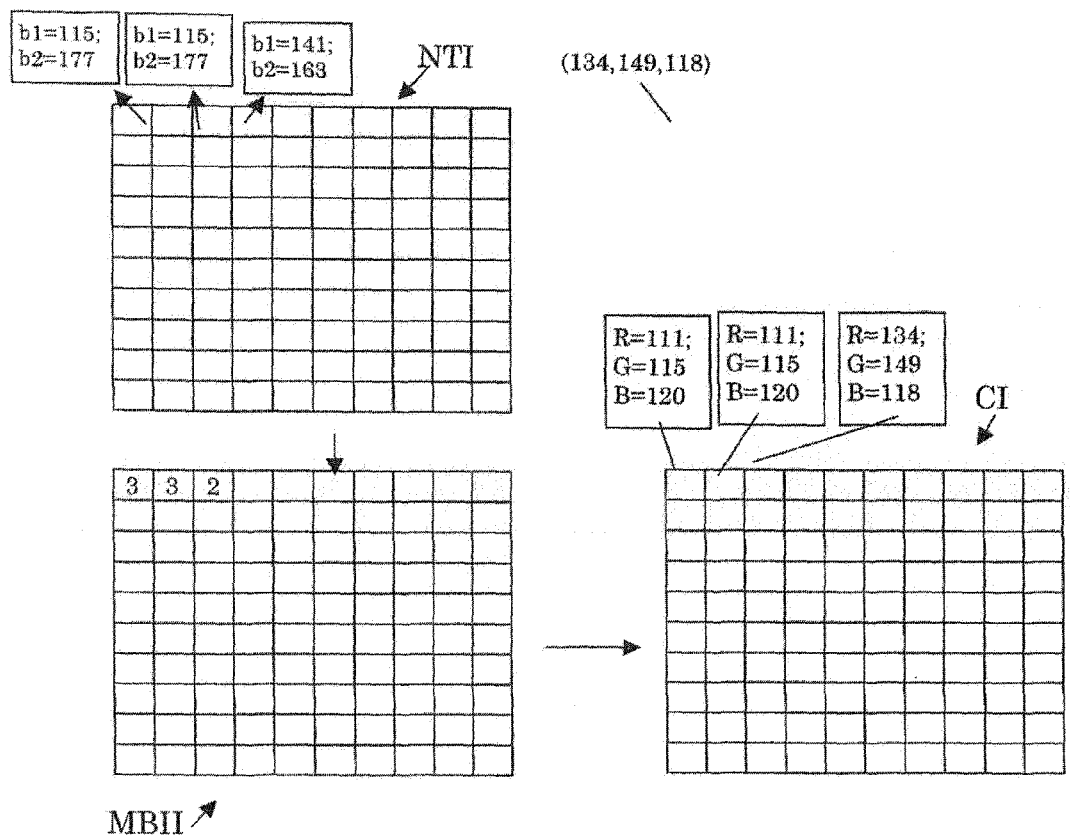
FIG. 5 is a diagram showing the use of the reference data in conversion of a target image.

An above-described system can be used to carry out a method for converting at least one night-vision image into a colour image, at comprising the steps, which can be taken in various orders:

recording a colour reference image CRI of a certain reference scene using the colour image recorder 5 (see FIGS. 1 and 4);

recording at least one night-vision reference image NRI of at least one reference scene with a first night-vision apparatus 1 (see FIGS. 2 and 4);

providing the reference data T1, T2 (see FIG. 4);

recording at least one target night-vision image NTI of a target scene TS, using the/a night-vision apparatus 1' (see FIGS. 3 and 5); and converting each recorded target image NTI into a respective colour image CI using the set of reference data (see FIGS. 3 and 5).

For example, the colour image recorder 5 can record at least one true-colour colour image, to provide the daytime colour information. As follows from the above, in the present embodiment, the night-vision sensor reference data and the target image are generated by substantially the same type of night-vision apparatus 1, 1'.

More particularly, FIGS. 1, 2 and 4 show the application of the colour image recorder 5 and night-vision apparatus 1, to generate a reference data set. Herein, the night-vision apparatus 1 is used to record a night-vision reference image NRI of a reference scene RS (see FIG. 2 and FIG. 4), particularly during night-time, or another impaired vision context. As follows from the above, a recorded night-vision reference image NRI can comprise first, night-vision, pixels with corresponding night-vision sensor reference data, for example data resulting from a first sensor band (values b1) and data resulting from a second sensor band (values b2) (one b1 value for each pixel and one b2 value for each pixel). An example of a recorded night-vision reference image NRI is also depicted in FIG. 4, indicating a first (top left) pixel having been given b1=141 and b2=163 dual band values.

Also, the colour image recorder 5 can record a colour reference image CRI of substantially the same reference scene RS, to provide suitable natural colour information of the scene (see FIG. 1). A recorded colour image CRI can comprise pixels with corresponding colour information, for example RGB information (see FIG. 4 as well, wherein as an example, a first pixel has RGB colour values R=134,G=149, B=118). The recording of the colour reference image CRI is preferably carried out during good visibility, for example during daytime. The colour reference image CRI and corresponding reference night-vision reference image NRI are preferably such that resulting data resulting can be compared and matched with each other by the data processor 30 in a following step.

A next step can be to combine the data, recorded by the colour image recorder 5 and night-vision apparatus 1 into a suitable reference data set. To this aim, a recorded colour image CRI of the reference scene and the corresponding recorded night-vision image NRI can be transferred to the data processor 30. Then, as an example, the data processor 30 can generate the set of reference data by selecting a plurality of first, night-vision, image portions (for example pixels), and indexing the night-vision sensor reference data in a first lookup table T1.

Also, corresponding second, colour, image portions can be selected and indexed, in a second table T2, such that reference scene image coordinates of a first image portion substantially correspond to reference scene image coordinates of the corresponding second image portion. The two tables can be combined into a single lookup table T1, T2 (see FIG. 4).

Vice-versa, for example, the data processor can start by selecting second image portions from the colour image CRI, and find the corresponding first image portions thereafter.

In the combined reference data set (for example the table T1, T2), each entry (i) refers to the night-vision sensor reference data and the corresponding colour information associated with a selected first image portion and a corresponding second image portion. As an example, in FIG. 4, the first entry (i=1) relates to pixels (or pixel groups) with respect to the same part of the reference scene from both reference images CRI, NRI, and comprises values b1=64, b2=67, R=66, G=65 and B=62.

Alternatively, in the above, there can already be provided a predetermined first lookup table T1, including a list of potentially achievable night-vision sensor data (or: a list of index pointers i having a plurality of achievable sensor values b1, b2 being assigned thereto). In that case, the second table T2 can simply be provided by matching the actual night-vision sensor data, relating to the night-vision reference image NRI, to the predetermined first lookup table T1 first, and in case a match is found, assigning the corresponding RGB information (from the corresponding part of the colour reference image CRI) to the respective index pointer (in the second table T2). For example, all pixels of a night image reference image NRI can be compared, in sequence, with the content of the predetermined first lookup table T1, so that each of these pixel can be assigned to a respective index pointer i, wherein the corresponding RGB values (obtained from the colour reference image CRI) are being loaded in the second table T2.

After the reference data set T1, T2 has been generated, it can be used in a simple manner to convert night-vision images into colour images. FIGS. 3 and 5 show the use of the reference data set T1, T2. In this case, a night-vision apparatus 1' can record a target image NTI relating to a target scene TS.

Then, a converter unit 10 of the apparatus 1' can process the recorded target image, using the reference data set T1, T2, to generate a colour image CI.

For example, the converter 10 can:
match target image portions, for example pixels, of the recorded target image NTI, to first image portions of the set of reference data T1, T2;
assign natural colour information parts to all target image portions in such way, that each target image portion is linked to the natural colour information part that belongs to the first image portion which matches the respective target image portion most closely; and
generate the colour image CI based on the assigned natural colour information parts.

For example, the converter 10 can find a closest match between night-vision sensor data associated with each target image portion of the recorded target image NTI and the night-vision sensor reference data of the first image portions. Then, the converter 10 can replace each target image portion with the second, colour, image portion, which second image portion is associated with the first image portion that most closely matched that target image portion, the matching being based on the night-vision sensor data, to generate the colour image CI.

For example, in the present embodiment, the converter 10 can replace each target image portion with the respective index entry pointer to provide an index image MBII (see FIG. 5). After having completed the index image MBII, the index image can simply be converted into the colour image CI, by replacing each index entry pointer with the respective colour information of that index entry.

This is schematically depicted in the example of FIG. 5. For example, a third pixel (top left) of a recorded target scene image NTI is found to have values b1=141 and b2=163. The converter 10 can compare these sensor band values with the lookup table T1, T2, to find that the second entry (i=2) matches these sensor band values most closely. Then, this closest matching index pointer (2) is being assigned to the third pixel of the index image MBII. In this way, all pixels of the index image MBII can be provided with data-set pointers in a simple manner. Then, the index pointers in the index image can simply be replaced by the respective RGB values. Thus, in this example, the pointer (2) of the third pixel is replaced by R=134, G=149 and B=118, and so on, such that the index image MBII is converted into the colour image CI.

As follows from the above, a multi-band target image NRI can be replaced by an indexed (for example imaginary) image MBII in which the index of each pixel refers to the multi-band sensor values (e.g. entry 2 in a Multi-band Lookup Table T1 refers to (141, 163)). When a limited set of entries is used, a set of multi-band combinations can be used that results in an image that matches the original as closely as possible. Next, Multi-band Lookup Table T1 can be replaced by a new one (the Natural Colour Lookup Table T2), and each pixel is coloured accordingly (e.g. for entry 2 of the Natural Colour Lookup Table the sensor signal {141,163} is replaced by the R,G,B colour value triple {134, 149, 118}).

The present method and system can rely on the availability of a corresponding image pair consisting of a natural colour reference image CRI and a multi-band nighttime sensor image NRI of a given scene RS (or a set of samples of different materials for which the sensor-output and the natural colour is known). The images of this image pair can be registered (i.e. for each pixel of the sensor image NRI there is a corresponding pixel in the natural colour image CRI that represents the same part of the depicted scene RS). The scene RS represented in a corresponding sensor and colour image pair NRI, CRI can be characteristic for the environment in which the multi-band nighttime sensor (or respective apparatus 1') will be used.

A Natural Colour Lookup Table T2 can then be created from the multi-band image NRI and the corresponding (RGB)-reference image CRI as follows. Starting with a first pixel of the multi-band reference image NRI, the corresponding index is sought in a predetermined Multi-band Lookup Table T1 (e.g. entry 2 for the first pixel). The entry in the Natural Colour Lookup Table T2 will become equal to the RGB-value of the corresponding pixel in the reference image (i.e. (134, 149, 118) in the example). The same procedure is preferably repeated for all pixels.

In an embodiment, in case there is more than one target pixel (or image portion or sample) with the same index (i) in the predetermined Multi-band Lookup Table T1, the entry can be set at the average over the two (or more) pixels with the same index. Alternatively, an average in a perceptual Lab-colour space can be taken. For example, in case several pixels have the same index, the average can be taken over the Lab values over all pixels with the same index, which can be converted to the RGB (herein, a difference between the CIE $L^*a^*b$ standard colour space specification is minimized), however, other weighing are possible.

Once the optimal colour transformation is derived the reference images CRI, NRI can be dispensed with. The colour transformation scheme is then fully defined by the Multi-band Lookup Table T1 and the Natural Colour Lookup Table T2.

Then, as follows from the above, an actual colour transformation can comprise transforming a multi-band target image NTI to an indexed image MBII (finding the closest match in the Multi-band Lookup Table T1), and then replacing the Lookup Table T1 of the multi-band sensor image by the Natural Colour Lookup Table T2 (i.e. using the RGB-values referred by this table).

For example, in this way, an optimal colour transformation can be provided for a particular environment (e.g. heath, mountainous area, forest, etc), wherein a colour mapping can be chosen that applies to the circumstances that the multiband sensor will be used in.

In this way, the colouring of night-vision imagery can be performed swiftly, for example real time. Objects in the target images can be 'fixed of colour' (i.e., do not substantially change colour). An optimum colorizing method can be provided, providing more naturally looking colour images CI (or substantially true-colour images). The method can be applied, for example, to target images detected with two sensor bands, three sensor bands or more bands.

In the above-described embodiment, the indexed data set is used to convert night-vision images into colour images. Alternatively, the data set can be used, in analogue manner, to convert colour images into night-vision images, for example to simulate night-vision. For example, in the latter case, the method can include:
  finding a closest match between colour information associated with each colour target image portion of a target colour image and the colour reference data of the colour image portions;
  replacing each target image portion with the respective index entry pointer to provide an index image; and
  converting the index image into the night-vision image by replacing each index entry pointer with the respective night-vision information of that index entry.

Also, images of other spectra can be converted.

Although the illustrative embodiments of the present invention have been described in greater detail with reference to the accompanying drawings, it will be understood that the invention is not limited to those embodiments. Various changes or modifications may be effected by one skilled in the art without departing from the scope or the spirit of the invention as defined in the claims.

It is to be understood that in the present application, the term "comprising" does not exclude other elements or steps. Also, each of the terms "a" and "an" does not exclude a plurality. Also, a single processor, night-vision apparatus, converter or other unit may fulfil functions of several means recited in the claims. Any reference sign(s) in the claims shall not be construed as limiting the scope of the claims.

For example, the term "night-vision" should be interpreted broadly, since the night-vision apparatus and method can also be used to view target scenes during periods of impaired vision other than night-time, such as during foggy and/or smoky conditions.

Also, for example, the colour information provider can be configured to generate a full reference image of a reference scene RS, on colour. Alternatively, the colour information provider can be configured to sample only parts of a reference scene, wherein resulting colour information samples can be used to provide desired colour information.

Besides, a reference scene can be an outdoor scene, and/or can comprise a plurality of objects or scene parts, for example one or more materials, vegetation, the sky, trees, buildings, for which night-vision sensor-output and the (natural/daytime) colour is known and/or can be determined.

Besides, in a simple embodiment, no colour image recorder is used to provide the colour information, wherein a detected night-vision image of a given reference scene is being examined to discern different scene parts (for example the sky, a building, a tree, a person), after which certain colour information is being assigned to those scene parts (for example manually). Herein, the colour information can simply be known or predetermined daytime colours of those scene parts.

Also, in an embodiment, there is provided a night-vision simulator system, the system comprising a processor configured to use a mentioned reference data set, to convert colour images into night-vision images.

The invention claimed is:

1. A method for converting at least one image of a first spectrum into an image of a second spectrum, comprising:
  recording a first-spectrum reference image of a reference scene with a first-spectrum recording apparatus, the first-spectrum recording apparatus being a night-vision apparatus, the first-spectrum reference image comprising first image portions with corresponding first-spectrum sensor reference data;
  providing corresponding second-spectrum reference information;
  providing a set of reference data from at least part of the first-spectrum sensor reference data relating to the reference scene, and at least a corresponding part of the second-spectrum information relating to the reference scene;
  providing a target first-spectrum image; and
  converting the target first-spectrum image into a second-spectrum image using the set of reference data,
  wherein the first-spectrum sensor reference data comprises multi-band data, relating to at least two different parts of a light spectrum, and the second-spectrum reference information is true-color color information,
  wherein the providing the set of reference data comprises:
    selecting, for a same reference scene, a plurality of first, first-spectrum, image portions and corresponding second, second-spectrum, image portions, such that reference scene image coordinates of a first image portion substantially correspond to reference scene image coordinates of a corresponding second image portion of the same reference scene, and creating an index containing the first-spectrum sensor reference data and the second-spectrum information for the same reference scene such that each entry in the index refers to the first-spectrum sensor reference data and the corresponding second-spectrum information associated with a selected first image portion and a corresponding second image portion of the same reference scene; and wherein the converting the target first-spectrum image into the second-spectrum image comprises:

finding, for individual portions of the target first-spectrum image, a closest matching entry in the index by comparing first-spectrum sensor data associated with the individual portions of the target first-spectrum image and the first-spectrum sensor reference data contained within entries of the index containing the first-spectrum reference data, and replacing, for the individual portions of the target first-spectrum image, each target first-spectrum image portion with the second, second-spectrum, image portion, the second image portion being associated with the closest matching entry in the index for the individual portion of the target first-spectrum image.

2. The method according to claim 1, comprising:

generating an indexed data set involving the indexing of a plurality of achievable first-spectrum sensor reference data parts which can be generated by the first-spectrum recording apparatus;

assigning the second-spectrum reference information to the indexed data set, utilizing the at least one first-spectrum reference image, such that the indexed first-spectrum sensor reference data parts and corresponding second-spectrum reference information parts are provided with the same index pointer.

3. The method according to claim 1, wherein the second-spectrum reference information is already known or is being provided by:

providing at least one second-spectrum reference image of each reference scene, the at least one second-spectrum reference image comprising second, second-spectrum, image portions with corresponding second-spectrum information.

4. The method according to claim 1 further comprising converting a target second-spectrum image into a first-spectrum image:

finding, for individual portions of the target second-spectrum image, a closest matching entry in the index by comparing second-spectrum sensor data associated with the individual portions of the target second-spectrum image and the second-spectrum sensor reference data contained within entries of the index containing, the second-spectrum reference data, and replacing, for the individual portions of the target second-spectrum image, each target second-spectrum image portion with the first, first-spectrum, image portion, the first image portion being associated with the closest matching entry in the index for the individual portion of the target second-spectrum image.

5. The method according to claim 2, comprising during converting target first-spectrum images into respective second-spectrum images:

finding a closest match between first-spectrum sensor data associated with each target image portion of a target image and the first-spectrum sensor reference data of the first image portions;

replacing each target image portion with the respective index entry pointer to provide an index image; and converting the index image into the second-spectrum image by replacing each index entry pointer with the respective second-spectrum information of that index entry or, vice-versa, in case of conversion of target second-spectrum images into respective first-spectrum images:

finding a closest match between second-spectrum information associated with each target image portion of a target second-spectrum image and the second-spectrum reference data of the second image portions;

replacing each target image portion with the respective index entry pointer to provide an index image; and converting the index image into the first-spectrum image by replacing each index entry pointer with the respective first-spectrum information of that index entry.

6. The method according to claim 1, wherein the first-spectrum sensor reference data and the target image are generated by substantially the same type of first-spectrum recording apparatus.

7. A system for converting a first-spectrum image into a second-spectrum image, the system comprising:

a first-spectrum recording apparatus configured to generate first-spectrum sensor reference data relating to a reference scene, the first-spectrum recording apparatus being a night-vision apparatus, the first-spectrum sensor reference data comprising multi-band data relating to at least two different parts of the spectrum;

a second-spectrum information provider configured to provide second-spectrum reference information relating to the reference scene, the second-spectrum reference information being true-color color information;

a target image generator providing a first-spectrum target image of a target scene, wherein the target image generator is a night-vision apparatus;

a converter configured to convert the first-spectrum target image into a second-spectrum image using the first-spectrum sensor reference data in combination with a corresponding part of the second-spectrum reference information; and a data processor, configured to process the first-spectrum sensor reference data and the second-spectrum reference information to provide at least one set of reference data by:

selecting, for a same reference scene a plurality of first, first-spectrum, image portions from a first-spectrum reference image and corresponding second, second-spectrum, image portions, such that reference scene image coordinates of a first image portion substantially correspond to reference scene image coordinates of a corresponding second image portion of the same reference scene; and creating an index containing the first-spectrum sensor reference data and the second-spectrum reference information for the same reference scene such that each entry in the index refers to the first-spectrum sensor reference data and the corresponding second-spectrum reference information associated with a selected first image portion and a corresponding second image portion of the same reference scene; and wherein the converter is configured to convert the target first-spectrum image into the second-spectrum image by:

finding, for individual portions of the target first-spectrum image, a closest matching entry in the index by comparing first-spectrum sensor data associated with the individual portions of the target first-spectrum image and the first-spectrum sensor reference data contained within entries of the index containing the first-spectrum reference data, and replacing, for the individual portions of the target first-spectrum image, each target first-spectrum image portion with the second, second-spectrum, image portion, the second image portion being associated with the closest matching entry in the index for the individual portion of the target first-spectrum image.

8. The system according to claim 7, comprising a memory wherein at least one set of reference data, comprising at least part of the mentioned first-spectrum sensor reference data, or potentially achievable first-spectrum sensor reference data, in combination with a corresponding part of the mentioned second-spectrum reference information, is stored.

9. The system according to claim 7, the system being configured to utilize various sets of reference data, relating to different reference scenes, wherein the converter is controllable to select one of the sets of reference data for converting target images into second-spectrum images.

10. The system according to claim 7, wherein the converter is configured to replace each target second-spectrum image portion with a first, first-spectrum, image portion, which first image portion is associated with the second image portion that most closely matched that target second-spectrum image portion, the matching being based on the second-spectrum reference data, to generate the first-spectrum image.

11. The system according claim 7, wherein the converter is configured to replace each target image portion with the respective index entry pointer to provide an index image, and to replace each index entry pointer with the respective second-spectrum or first-spectrum information of that index entry.

12. The system according to claim 7, wherein the indexed data set comprises at least one table relating to first image portions and respective first-spectrum sensor data and relating to second image portions of a corresponding second-spectrum image and respective second-spectrum reference information.

13. The system according to claim 7, comprising a second-spectrum image recorder to record the second-spectrum reference information.

14. A reference data set, generated in a method according to claim 1, the reference data set being provided from at least part of the first-spectrum sensor reference data relating to the reference scene, and at least a corresponding part of the second-spectrum reference information relating to that reference scene.

15. A non-transitory computer-readable medium comprising a reference data set according to claim 14.

16. The method according to claim 2, comprising generating the indexed data set involving the indexing of a plurality of achievable first-spectrum sensor reference data parts which can be generated by the first-spectrum recording apparatus, by providing a list of all achievable first-spectrum sensor values or an array of a plurality of achievable first-spectrum sensor values.

17. The method according to claim 3, wherein the second-spectrum reference information is already known via visual inspection of a reference scene.

18. The method according to claim 2, including indexing the first-spectrum sensor reference data and the second-spectrum information in at least one look-up table.

19. The system according to claim 13, comprising the second-spectrum image recorder to record at least one second-spectrum reference image.

* * * * *

UNITED STATES PATENT AND TRADEMARK OFFICE
CERTIFICATE OF CORRECTION

PATENT NO. : 8,478,028 B2  Page 1 of 1
APPLICATION NO. : 12/376253
DATED : July 2, 2013
INVENTOR(S) : Hogervorst et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this
Eighth Day of September, 2015

Michelle K. Lee
*Director of the United States Patent and Trademark Office*